United States Patent [19]
Baker et al.

[11] Patent Number: 5,406,714
[45] Date of Patent: Apr. 18, 1995

[54] LEVEL VIAL ASSEMBLY

[75] Inventors: John G. Baker, Rochester, Vt.; John D. Olson, deceased, Late of Olson, Conn., text by Patricia Olson, executrix

[73] Assignee: The Stanley Works, New Britain, Conn.

[21] Appl. No.: 306,246

[22] Filed: Sep. 14, 1994

Related U.S. Application Data

[63] Continuation of Ser. No. 41,961, Apr. 2, 1993, abandoned.

[51] Int. Cl.$^6$ .......................... G01C 9/26; G01C 9/28
[52] U.S. Cl. ........................................ 33/382; 33/381; 33/379
[58] Field of Search ................. 33/379, 381, 382, 389, 33/390; D10/69

[56] References Cited

U.S. PATENT DOCUMENTS

| | | | |
|---|---|---|---|
| 591,139 | 10/1897 | Morton | 33/381 |
| 1,213,020 | 1/1917 | Roeske . | |
| 1,348,742 | 8/1920 | Roeske | 33/381 |
| 2,502,905 | 4/1950 | Vaida et al. . | |
| 2,536,788 | 1/1951 | Vaida . | |
| 2,750,678 | 6/1956 | Ziemann . | |
| 3,029,524 | 4/1962 | Vaida et al. . | |
| 3,167,870 | 2/1965 | Streeter . | |
| 3,311,990 | 4/1967 | Wright . | |
| 3,442,024 | 5/1969 | Don . | |
| 3,456,354 | 7/1969 | Wright . | |
| 3,593,428 | 7/1971 | Jacoff | 33/379 |
| 3,738,015 | 6/1973 | De Jong | 33/379 |
| 3,842,514 | 10/1974 | Scheyer | 33/379 |
| 3,878,618 | 4/1975 | Freeman | 33/379 |
| 3,921,306 | 11/1975 | Provi . | |
| 4,011,660 | 3/1977 | Johnson | 33/379 |
| 4,124,940 | 11/1978 | Vaida | 33/379 |
| 4,347,088 | 8/1982 | Jacquet | 33/379 |
| 4,407,075 | 10/1983 | MacDermott et al. | 33/379 |
| 4,492,038 | 1/1985 | Mayes | 33/379 |
| 4,503,623 | 3/1985 | Gould, Jr. . | |
| 4,534,117 | 8/1985 | Haefner et al. . | |
| 4,559,714 | 12/1985 | Wright | 33/379 |
| 4,581,828 | 4/1986 | Handler et al. | 33/379 |
| 4,685,219 | 8/1987 | Haefner et al. | 33/379 |
| 4,860,459 | 8/1989 | Dengler . | |
| 4,862,595 | 9/1989 | Drumright . | |
| 4,979,310 | 12/1990 | Wright | 33/381 |
| 5,033,199 | 7/1991 | Wilcox et al. | 33/379 |

FOREIGN PATENT DOCUMENTS

| | | | |
|---|---|---|---|
| 620805 | 5/1961 | Italy | 33/379 |
| 258624 | 5/1949 | Sweden | 33/381 |

*Primary Examiner*—Thomas B. Will
*Attorney, Agent, or Firm*—Chilton, Alix & Van Kirk

[57] ABSTRACT

A level vial assembly for use in a carpenter's or mason's level. The assembly includes a vial mounting subassembly to be mounted in a level body, consisting of at least a vial holding plate and one or more vials which are mountable therein, and one, or preferably two, bezel-lens subassemblies for protecting the vial. The vial is positioned in the mounting plate between a pair of oppositely directed notches, and is held in position by a tab which extends outwardly from the side of the vial and bears against the holding plate. The tab limits lateral movement of the vial in one direction. The holding plate is mountable within an aperture in the level body. The bezel-lens subassemblies are mountable in the level body aperture on opposite sides of the vials. One of the bezel-lens subassemblies includes a vial support portion adapted to bear against the vial to prevent lateral movement in another lateral direction. The level vial assembly can be easily and precisely mounted to a level body, resulting in a high-quality product at a reasonable cost of assembly.

21 Claims, 3 Drawing Sheets ively oriented 65 in a working position relative to the central plane of the holding plate. The mounting tab keeps the vial from being laterally displaced out of the plane of the holding
LEVEL VIAL ASSEMBLY This is a continuation of application Ser. No. 08/041,961, filed on Apr. 02, 1993, now abandoned.

BACKGROUND AND SUMMARY OF THE INVENTION

The invention relates generally to levels of the type used by carpenters, masons and the like, and is particularly directed to a new and improved level vial assembly and a method for assembling the level vial assembly on a level body.

A primary object of the invention is to provide a level vial assembly that lends itself to automatic assembly with high accuracy, thus providing high quality at minimum cost.

Another object of the invention is to provide a level having an improved vial that is precision mounted in the level body in a facile manner.

Another object of the invention is to provide a pair of bezel-lens subassemblies which are designed for automatic precision mounting on opposite sides of a vial to protect and/or retain the vial.

Yet another object of the invention is to provide a curved level vial that is precision-molded in an efficient manner.

Another object of the invention is to provide a level vial assembly having a bezel-lens subassembly that is replaceable by the user, thereby eliminating the necessity of sending the level to the manufacturer to make this type of repair.

A further object of the invention is to provide a novel method of assembling a level vial assembly on a level body.

Other features and advantages of the invention will be in part obvious and in part pointed out more in detail hereinafter.

The invention in a preferred form is a level vial assembly for use in a carpenter's or mason's level. The assembly is configured for insertion into an aperture which extends through the level body in a direction perpendicular to the length of the working surface of the level. The assembly includes a vial holding plate which is sized to fit within the level body aperture and is supported within the aperture, preferably by adhesion to a shoulder or other stop means formed around the perimeter of the aperture. The holding plate has an opening which defines a pair of oppositely-directed notches for supporting a level vial in order to fix the longitudinal position of the vial and to angularly orient the vial at a preselected relationship relative to the working surface. The vial, which is designed to be placed between the notches, includes a tubular portion having constant inner and outer diameters, and is curved slightly along its longitudinal dimension. The vial preferably is molded, and in order to allow for efficient production, has a curved parting line extending longitudinally along opposite sides of the vial. The vial is properly positioned in the holding plate by at least one vial mounting tab which extends tangentially outward from the side wall of the vial proximate a longitudinal end of the vial. Preferably, the inner wall of the mounting tab bears against one side of the holding plate, proximate one of the notches, when the vial is oriented in a working position relative to the central plane of the holding plate. The mounting tab keeps the vial from being laterally displaced out of the plane of the holding plate on the side of the holding plate opposite to the mounting tab.

The level vial assembly further includes at least one bezel-lens subassembly which is mountable in the aperture on one side of the vial holding plate in order to cover and protect the vial. The subassembly includes a lens through which the vial can be viewed by the user. The lens is supported in a gasket or bezel which is sized to fit within the aperture. The bezel-lens subassembly is mountable proximate the tabbed side of the vial and includes means for limiting lateral movement of the vial relative to the holding plate in a direction toward the tabbed side of the vial. The vial support means preferably is a skirt portion having a semicircular indentation for supporting the vial along one side. The skirt prevents the vial from being laterally displaced out of the holding plate on the side of the holding plate which is in contact with the mounting tab. Preferably, the vial is protected by a bezel-lens subassembly on each of two opposite sides, and each subassembly has vial support means defined by a skirt which contacts the sides of the vial near its ends. The skirt contributes to the aesthetics of the level by shielding the ends of the vial from the user's view.

The invention further includes a novel method for assembling a level vial assembly on a level body having an aperture for receiving the assembly. The method comprises mounting a vial holding plate in the aperture so that a portion of the holding plate abuts a stop means in the aperture. The holding plate includes an opening having a vial mounted therein. The vial includes a tubular portion having longitudinally spaced ends and an outer side wall having at least one tangentially extending tab for limiting lateral movement of the vial in a first direction perpendicular to the plane of the alignment plate. The method further comprises mounting a bezel lens subassembly in the aperture on the tabbed side of the vial. The bezel lens subassembly limits lateral movement of the vial in a second direction opposite to the first direction. Preferably, a second bezel-lens subassembly is mounted on the untabbed side of the vial to cover and protect that side of the vial.

The invention accordingly consists in the features of construction, combination of elements, arrangement of parts and the several steps of assembly, in relation to each other, which will be exemplified in the following detailed disclosure.

DETAILED DESCRIPTION OF THE DRAWINGS

Figure 1:
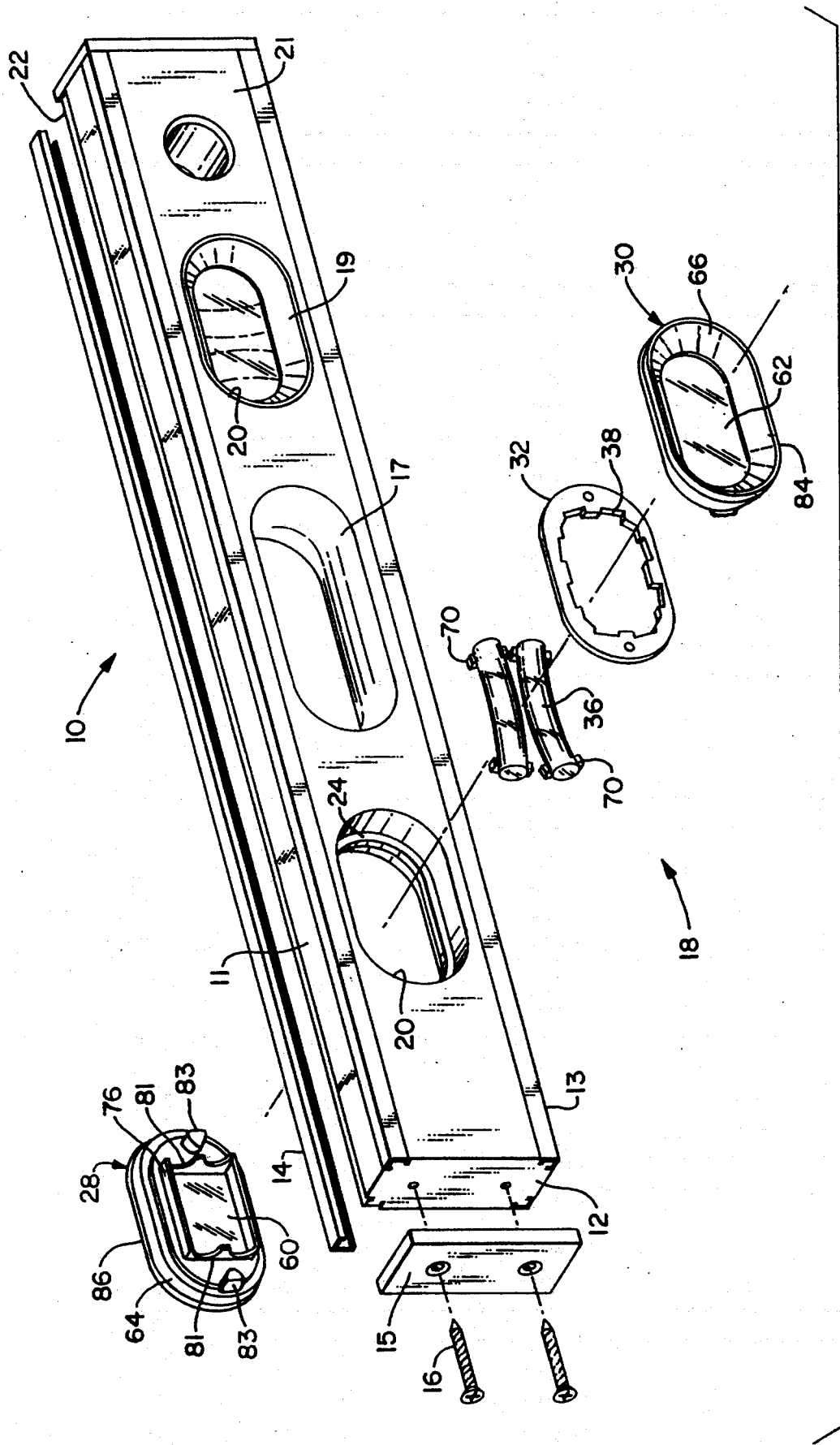
FIG. 1 is a partially exploded, perspective view of a level incorporating the features of the present invention.

Referring now to the drawings in detail wherein like numerals represent like parts throughout, a level 10 is shown as consisting of a rectangular level body 12, preferably made of wood, such as mahogany, the level body 12 having parallel upper and lower working surfaces 11, 13. The edges of the level body are bound with L-shaped binding strips 14, which are made of brass or another suitable material, to prevent them from being nicked or cut. As shown, one portion of each strip bounding a working surface lies in the plane of that surface, thereby forming part of the working surface. An end cap 15 is mounted at each longitudinal end of the level body 12 in a suitable manner, such as by a pair of screws 16. The level body may have one or more handles such as the central handle 17 defined by elongated openings extending through the entire thickness of the level body. The handle 17 also reduces the weight of the level.

Level (horizontal) and plumb (vertical) vial assemblies, 18, 19 respectively, are mounted within oblong apertures 20 that extend entirely through the body 12 from the front wall 22 to the back wall 21 thereof. For ease of understanding and clarity of description, only assembly 18 will be described in detail, it being understood that assembly 19 is substantially identical except for those variations necessary to accommodate the orientation of the vials within the assembly.

Level vial assembly 18 includes a vial mounting subassembly 23 sandwiched between a pair of front and back bezel-lens subassemblies 28, 30, respectively, that enclose the vials from opposite sides of the level body and are secured in the aperture 20 in a manner to be described in greater detail hereinafter.

Figure 5:
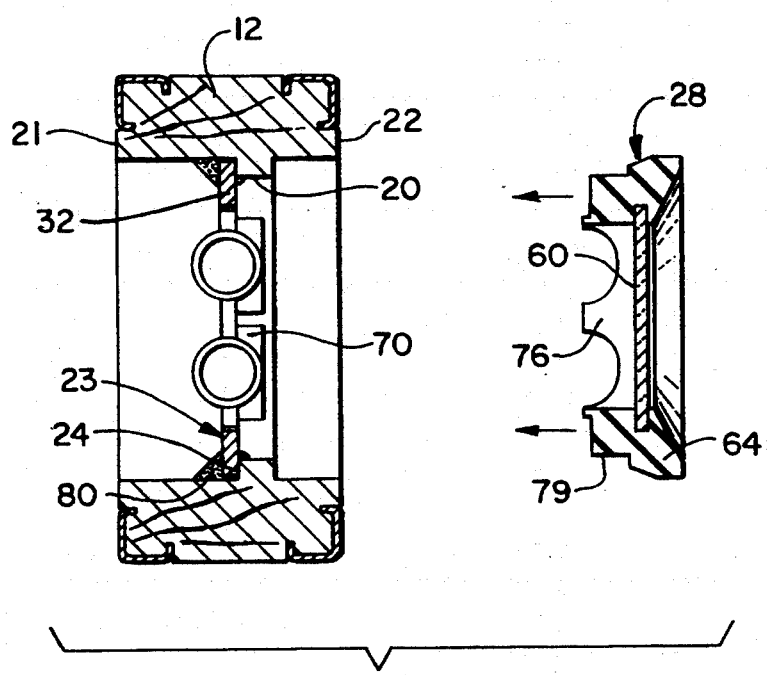
FIG. 5 is a transverse section view of the level vial assembly shown in FIG. 1 at an intermediate stage of assembly, the view being exploded to show the front bezel-lens subassembly before it is mounted on the level body.
Figure 6:
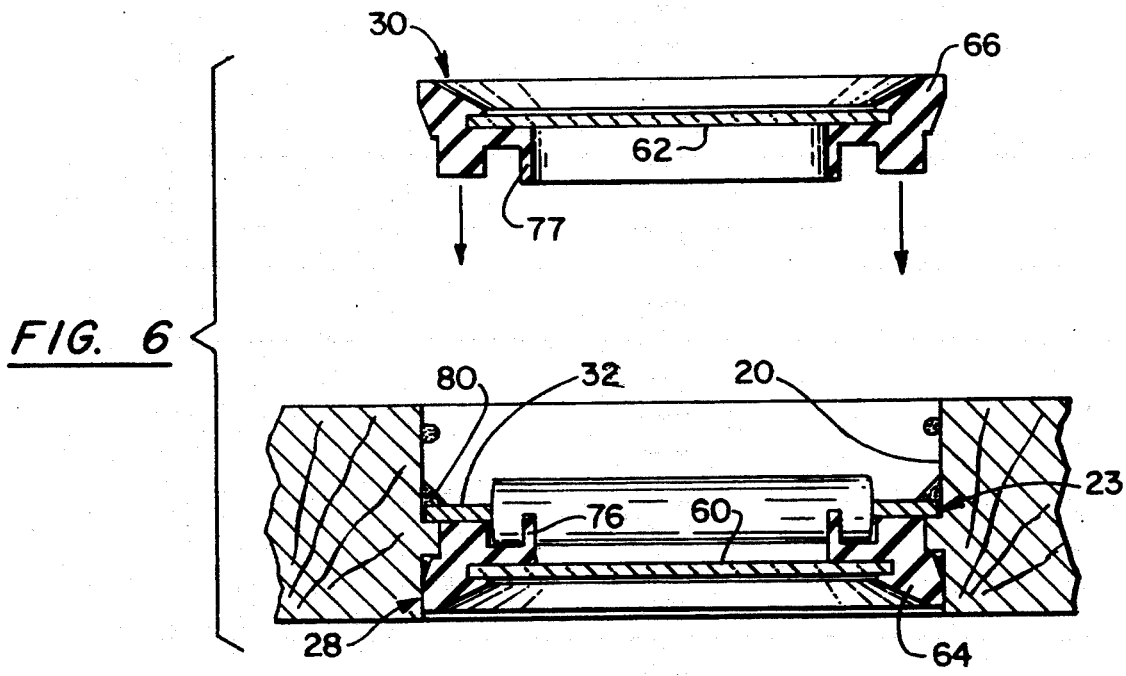
FIG. 6 is a partial longitudinal section view of the level vial assembly shown in FIG. 1, the view being exploded to illustrate the assembly just prior to adhesion of the back bezel-lens subassembly.

The aperture 20, as shown in FIGS. 1, 5 and 6, includes an interior projection spaced from both the front and back walls 22, 21 and conforming to the circumferential contour of the aperture. The projection defines a plate mounting shoulder 24 that, as best shown in FIG. 5, is offset from the center of the aperture by an amount such that the vial mounting subassembly 23 positioned therein will be centered in the aperture when it abuts the shoulder 24.

Figure 4:
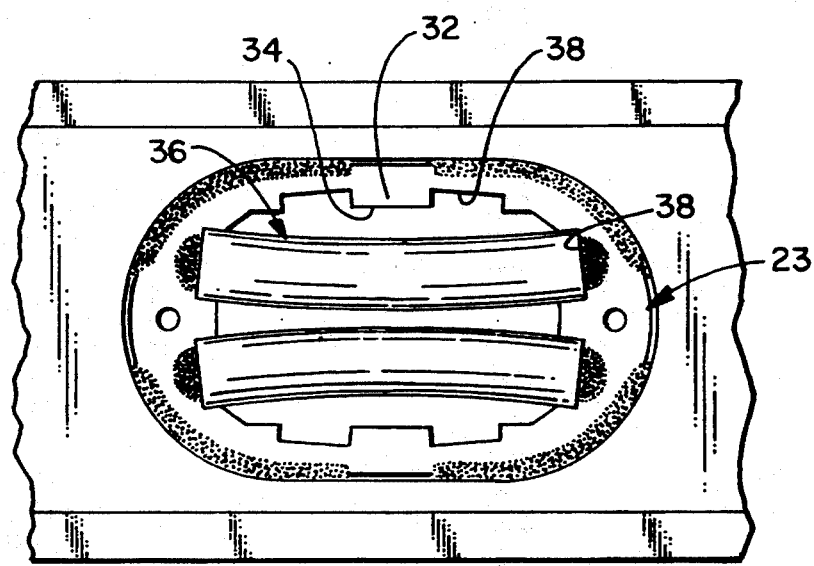
FIG. 4 is a partial back view showing a portion of the level vial assembly of FIG. 1 during assembly of the vial holding plate subassembly.

As shown in FIG. 4, the level vial mounting subassembly 23 consists of a planar vial holding plate 32 of oval contour having an enlarged central opening 34 across which spans a pair of vials 36, which are curved slightly in the longitudinal direction. The vials preferably fit snugly in position in a horizontal, generally parallel arrangement between opposite pairs of rectangular vial mounting notches 38 precisely formed in the holding plate 32 on the edge of opening 34. In the holding plate opening 34, the notches 38 are configured to conform to the diametric end dimensions of the vial and are disposed at a slight angular orientation so as to accommodate the arcuate contour of the vials. The holding plate 32, which preferably is made of lightweight metal but also can be made of other suitable materials, including, but not limited to, plastic and steel, is dimensioned to fit comfortably within the aperture 20 in the level body 12 and abut against the shoulder 24. As shown in FIGS. 5 and 6, the holding plate 32 is adhered to the mounting shoulder 24 during assembly of the level. The preferred embodiment of the holding plate 32 has four pairs of oppositely directed notches 38 in the opening 34, i.e. two pairs of notches for holding the two level, horizontally-disposed vials, and two pairs of notches for alternatively holding two plumb, vertically-disposed vials, as shown in FIG. 4. This provides economy of manufacture in that a single type of holding plate can be manufactured for supporting vials which are oriented either horizontally or vertically.

Figure 2:
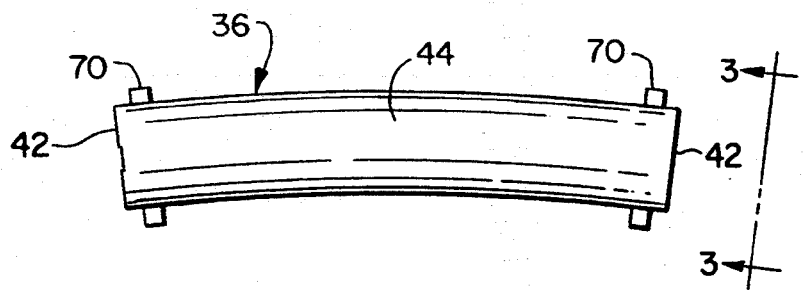
FIG. 2 is a side elevational view of a vial used in the level vial assembly shown in FIG. 1.
Figure 3:
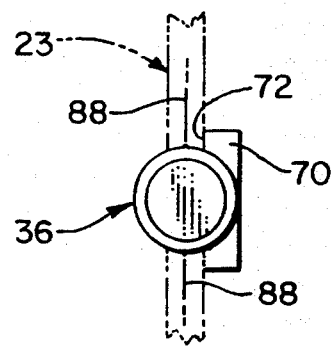
FIG. 3 is an end view of the vial shown in FIG. 2 with the vial holding plate shown in phantom.

As is best seen in FIGS. 2 and 3, the vials 36 are tubular members, and preferably have generally constant inner and outer diameters along their length. The vials typically are made of plastic, but alternatively can be made of glass or any other suitable material. Each plastic vial is molded in a clamshell mold, resulting in a clamshell outer diameter parting line, preferably following the maximum arc of the vial on opposite concave and convex sides of the vial. As a result of this configuration, the vials can be rapidly and accurately molded with quick release of the transparent plastic vial from the mold without requiring the vial to have a tapered configuration. In this connection, it is noted that plastic is preferred over glass for ease of control over the dimensions of the vial and for resistance to breakage. A disk-shaped end closure (not shown) fits within the open end of the vial in a conventional manner and is ultrasonically welded to an interior shoulder to enclose the liquid therein as well as the air space of controlled size forming the bubble (not shown) within the vial.

According to the invention, a novel alignment means is provided for precisely aligning the vials 36 in the vial holding plate 32. As shown in FIGS. 1–3, this alignment means is a set of four mounting tabs 70 formed in pairs near opposite longitudinal ends 42 of each of the vials 36 along their outer side walls 44. The tabs 70, which preferably are integrally formed on the vials 36 during molding of the vials, extend tangentially outwardly, see FIG. 3, in opposite directions from the tubular portions of the vials. The tabs 70 do not extend beyond the ends of the vials, thereby providing space for mounting the vial end closure. As shown in FIGS. 2 and 3, the mounting tabs on each vial preferably are all on the same side of the parting line of the vial. However, as will be appreciated, the tabs may be arranged in a variety of positions including on opposite sides of the vial at opposite ends, or even at the same end. The tabs 70 have flat vial-facing walls 72, which are parallel to the central plane through the parting line 88 that divides the tubular portion of the vial longitudinally into two complementary halves. The walls 72 are spaced from the central parting plane of the vial a distance of one-half of the thickness of the holding plate, as illustrated in FIG. 3. When the vials are mounted in the holding plate, the walls 72 of the tabs 70 bear against the planar surface of the holding plate adjacent to the notches, thereby providing for facile and precise central alignment of the curved level vials in the holding plate 32. Furthermore, for situations in which the vials 36 are designed to fit somewhat loosely in the holding plate 32, the tabs 70 keep the vials from falling out of the holding plate 32 on the side of the plate opposite to that which directly supports the tabs 70. Preferably, the tabs are positioned on the tubular portion of the vial such that a plane through the longitudinal parting line of the vial is coextensive with a plane through the center of the holding plate 32 which extends in a direction parallel to the planar walls of the holding plate 32.

The bezel-lens subassemblies 28, 30 that enclose the subassembly 23 preferably are substantially identical and consist of flat transparent cover plates or lenses 60, 62 embedded in peripheral supporting bezels 64, 66. The lens-bezel subassemblies are formed by insert molding the glass or hard coated plastic lenses in the bezels. Preferably, the bezels 64, 66 are oval shaped, are dimensioned to fit tightly within the aperture 20 on opposite sides of the vial holding plate 32, and are adapted to be adhered to the wall of the aperture 20 and preferably also to the vial holding plate. As best seen in FIG. 1, the bezels 64, 66 include rectangular skirts 76, 77, respectively, which extend around the inner perimeter thereof near the lenses, and project inwardly from proximate the inner side of the lenses 60, 62 in a direction perpendicular to the plane of the lens. Each skirt has two pairs of semicircular-type notches or indentations 81 formed thereon for receiving a portion of the outer side wall of each of the two vials. The indentations 81 receive the vials near their ends in order to conceal the ends for aesthetic reasons. Furthermore, the skirt 76 on the bezel-lens subassembly 28 which is on the same side of the holding plate 34 as the vial tabs 70 keeps the vials from moving laterally in a direction toward the skirt. Thus, due to the combination of the vial tabs 70, which bear against the holding plate, and the skirt 76, which bears against the vials 36, lateral movement of the vials 36 in the level vial assembly is substantially prevented. The bezel 66, which is mounted in the aperture 20 on the side of the level body is opposite to the mounting shoulder 24, holds the support plate 32 in place against the shoulder 24. Inwardly projecting bezel supports 83 are located at each longitudinal end of each bezel on the inner side thereof to support the bezel against the vial holding plate 32.

The bezels 64,66, which preferably are identical to each other in order to minimize manufacturing costs, each have an indentation 79 along the lower edge thereof. While this indentation is not required in the front bezel, it is needed in the back bezel to accommodate the projection carrying the shoulder 24. The bezels which surround the vertical or plumb vials are identical to bezels 28, 30 with the exceptions that the indentations 81 on the skirts which support the plumb vials are formed on the horizontal portion of the skirts, and the bezel supports 83 extend along the length of, and are connected to, the short sides of the skirts.

The level vial assembly 18 of the invention may be mounted on the level body 12 automatically, manually, or by a combination of automatic and manual mounting means. The vials 36 are placed in the holding plate 32 in a snug-fitting arrangement with the walls 72 of the tabs 70 bearing against the planar surface of one side of the holding plate. An adhesive-sealant material 80 is applied to the shoulder 24 of the level body 12, and the holding plate 32 is adhered to the shoulder 24. The adhesive-sealant 80 is applied to the ends of the vials on the side of the holding plate opposite to the tabs, as illustrated in FIG. 4, to further secure the vials. Adhesive-sealant 80 is then applied around the perimeter of the holding plate on both sides of the plate, as shown in FIGS. 4–6, and additional adhesive-sealant 80 is applied to the perimeter of the level body aperture 20 on each side of the shoulder 24 approximately midway between the shoulder 24 and each of the front and back walls 21, 22. The bezel-lens subassemblies 28, 30 are then placed on each side of the holding plate, such that the skirts of the bezels contact the vials and the outer edges 84, 86 of the bezels 28, 30, respectively, are approximately flush with, and slightly inside the outer side surfaces 21, 22 of the level body 12. The adhesive-sealant 80 seals out water and holds the bezel-lens subassemblies in place.

According to the preferred embodiment of the invention, the adhesive which is used to mount the bezel-lens subassemblies is a light adhesive. If the lens breaks or the bezel-lens subassembly wears out, the user of the level can pry out the bezel-lens subassembly himself and replace it with a new bezel-lens subassembly, which can then be adhered in the opening. In this manner, the user of the level can avoid having to either replace the entire level or send it to the manufacturer for repair.

In another embodiment of the level body 12, the apertures 20 of the level body 12 are provided with interior grooves (not shown) on each side of the mounting shoulder 24 midway between the longitudinal center line of the level and the respective side walls 21,22. The grooves are adapted to accommodate the adhesive employed when the bezel-lens subassemblies are secured in the apertures 20.

Although dimensions will vary and are not critical, a carpenter's level according to the invention preferably is 18 inches long, having a pair of horizontal or level vials in one aperture which extend generally parallel to the working surfaces, and a pair of vertical or plumb vials in another aperture which are generally perpendicular to the working surfaces. A mason's level according to the invention preferably has a length of 48 inches, and includes one central pair of horizontal vials and two pairs of plumb vials near opposite ends. The horizontal vials of the preferred embodiment are 2 inches long and ⅜ inches in diameter. The plumb vials are 1.3 inches long and ⅜ inches in diameter.

As will be apparent to persons skilled in the art, various modifications and adaptations of the structure above described will become readily apparent without departure from the spirit and scope of the invention, the scope of which is defined in the appended claims.

What is claimed is:

1. A level vial assembly for use in a level having a pair of opposite side faces and a vial housing aperture provided with a peripheral abutment, comprising:

a vial holding plate removably positionable is said aperture from one of said opposite side faces to bear against said peripheral abutment and limit lateral movement of the plate through the aperture, said plate including an opening having at least one pair of oppositely directed vial mounting notches, at least one vial including a closed tubular portion having an outer side wall, the vial having at least one mounting tab extending tangentially outward from the outer side wall for bearing against the holding plate to properly position the vial relative to a central plane of the vial holding plate and to limit lateral movement of the vial in a first direction, and first and second bezel-lens subassemblies which are mountable on opposite sides of the holding plate, each bezel-lens subassembly including a lens supported in a bezel which is configured to be snugly mounted in said aperture and sealed within the level with a sealing adhesive, the first bezel-lens subassembly being mountable proximate a tabbed side of the vial against said holding elate and including means for limiting lateral movement of the vial relative to the holding plate in a second direction opposite to the first direction and limiting lateral movement of the holding plate from said abutment.

2. A level vial assembly according to claim 1, wherein the vial is curved slightly in the longitudinal direction and has a longitudinal parting line formed along the outer side wall during molding.

3. A level vial assembly according to claim 1, wherein the vial has at least one mounting tab near each longitudinally spaced end, the mounting tabs extending tangentially from the outer side wall.

4. A level vial assembly according to claim 3, wherein the vial has a pair of opposite, longitudinal ends, and the mounting tabs are spaced from the ends and are all located on the same side of the holding plate.

5. A level vial assembly according to claim 1, wherein each said bezel-lens subassembly includes said lens which is insert molded in said bezel.

6. A level vial assembly according to claim 1, wherein the vial holding plate has at least two pairs of notches and has a pair of vials mounted therein.

7. A level comprising:
an elongated level body of generally rectangular section including at least one working surface and a pair of opposite side faces, the body having an aperture extending through the side faces with an abutment within the aperture spaced from said faces,
a vial holding plate mounted in the aperture from one of said opposite side faces to be in engagement with the abutment, the holding plate including an opening having at least one pair of oppositely directed vial mounting notches,
at least one vial including a closed tubular portion mountable between the pair of vial mounting notches, the vial having an outer side wall including at least one mounting tab extending tangentially outwardly therefrom for bearing against the holding plate to properly position the vial relative to a central plane of the vial holding plate and to limit lateral movement of the vial in a first direction, and
first and second bezel-lens subassemblies which are mountable in the aperture on opposite sides of the holding plate, at least one of said subassemblies limiting lateral movement of said holding plate away from said abutment, each bezel-lens subassembly including a lens supported in a bezel which is configured to be mounted in the level body, the first bezel-lens subassembly being mountable proximate a tabbed side of the vial and including means for limiting lateral movement of the vial relative to the holding plate in a second direction opposite to the first direction.

8. A level according to claim 7, wherein the vial is curved slightly in the longitudinal direction and has a longitudinal parting line formed along the outer side wall during molding.

9. A level according to claim 7, wherein the vial has a mounting tab near each longitudinally spaced end, the mounting tabs extending tangentially from the side wall.

10. A level according to claim 9, wherein the vial has a pair of opposite, longitudinal ends, and the mounting tabs are spaced from the ends and are all located on the same side of the holding plate.

11. A level according to claim 7, wherein each said bezel-lens subassembly includes said lens which is insert molded in said bezel.

12. A level according to claim 7, wherein the first and second bezel-lens subassemblies are removably mountable in the level body aperture in a snug-fitting arrangement.

13. A level according to claim 12, wherein the first and second bezel-lens subassemblies are held in place in the level body aperture with a sealant comprising light adhesive.

14. A level vial for use with a level having an elongated vial holding means with a longitudinal center line comprising an elongated, longitudinally curved tube having a constant outer diameter, first end second longitudinally spaced ends, and an outer side wall having a mounting tab extending tangentially therefrom near each longitudinally spaced end for properly aligning the vial in the level, the vial being molded with a longitudinal parting line, said tab being spaced from the longitudinal parting line so that when in abutment with the holding means it centers the vial along the longitudinal center line.

15. A method of assembling a level vial assembly on a level body having a pair of opposite side faces, wherein the level body includes an aperture having vial holding plate stop means, the method comprising:
mounting a vial holding plate in the aperture from one of said opposite side faces so that a portion of the holding plate abuts the stop means, the holding plate including an opening having a vial mounted therein, the vial including a tubular portion having longitudinally spaced ends and an outer side wall having at least one tangentially extending tab for preventing lateral movement of the vial in a first direction perpendicular to the plane of the alignment plate, and
mounting a first bezel-lens subassembly in the aperture from one of said opposite side faces to be on the tabbed side of the vial, the first bezel-lens subassembly limiting lateral movement of the vial relative to the plate in a second direction opposite to the first direction.

16. A method according to claim 15, further comprising the step of mounting a second bezel-lens subassembly in the opening on the side of the holding plate opposite to the first bezel-lens subassembly, at least one of said first and second subassemblies limiting movement of said plate away from said stop means.

17. A method according to claim 16, wherein the first bezel-lens subassembly is formed by insert molding a lens into a peripheral gasket.

18. A method according to claim 15, wherein the vial is molded in a clamshell mold, the molding process forming a longitudinal parting line on the vial.

19. A method according to claim 15, wherein the vial holding plate stop means is a shoulder formed in the aperture, and the step of mounting the vial holding plate comprises connecting the holding plate to the shoulder.

20. A method according to claim 15, wherein the vial tab is integrally formed with the tubular portion of the vial.

21. A method according to claim 16, wherein the first and second bezel-lens subassemblies are adhered to at least one of the level body and the vial holding plate.

* * * * *